United States Patent [19]

Smith

[11] 4,073,843
[45] Feb. 14, 1978

[54] PROCESS OF PARTIALLY EXPANDING THERMOPLASTIC PARTICLES USING A MIXTURE OF STEAM AND A HOT DRY GAS

[75] Inventor: Stuart Bruce Smith, Chelmsford, Mass.

[73] Assignee: Foster Grant Co., Inc., Leominster, Mass.

[21] Appl. No.: 541,302

[22] Filed: Jan. 15, 1975

Related U.S. Application Data

[63] Continuation-in-part of Ser. No. 288,230, Sept. 11, 1972, abandoned, and Ser. No. 359,578, May 11, 1973, abandoned.

[51] Int. Cl.² ............................................. B29D 27/00
[52] U.S. Cl. .................................. 264/53; 260/2.5 B; 264/DIG. 9
[58] Field of Search ..................... 264/DIG. 9, 51, 53, 264/DIG. 10; 260/2.5 B

[56] References Cited

U.S. PATENT DOCUMENTS

| | | | |
|---|---|---|---|
| 3,023,175 | 2/1962 | Rodman | 264/DIG. 9 |
| 3,378,245 | 4/1968 | Frank | 264/DIG. 9 |
| 3,428,720 | 2/1969 | Denslow | 264/DIG. 9 |
| 3,792,138 | 2/1974 | Lammers | 264/DIG. 10 |
| 3,832,430 | 8/1974 | Noziere | 264/DIG. 9 |
| 3,963,816 | 6/1976 | Smith | 264/DIG. 9 |

OTHER PUBLICATIONS

Koppers Bulletin, "Technical Manual Dylite Expandable Polystyrene; Pre-Expansion of Dylite," Pittsburg, Pa., Koppers Co., Inc., Bulletin C-9-273, Chapter 3b, Nov. 15, 1959, p. 12.
*Encyclopedia of Polymer Science and Technology,* vol. 8, Section: "Mechanical Properties" New York, Interscience, c1968, pp. 445-451.
Brydson, J. A. "Plastics Materials", Princeton, N. J., D. Van Nostrand, c1966, pp. 33-37.
*Encyclopedia of Polymer Science and Technology,* Section: "Characterization of Polymers," vol. 3, New York, Interscience, c1965, pp. 619-631.
Celanese Bulletin GIC, 7th Edition: "Standard Tests On Plastics," Newark, N. J., Celanese Plastics Co., Div. of Celanese Corp., Apr. 1974, pp. 3, 11 and 12.

*Primary Examiner*—Philip Anderson
*Attorney, Agent, or Firm*—Leonard S. Selman

[57] ABSTRACT

Thermoplastic material in particulate form and containing a blowing agent is partially expanded by means of a mixture of steam and another hot dry gas such as air present in specified proportions in said mixture.

6 Claims, 1 Drawing Figure

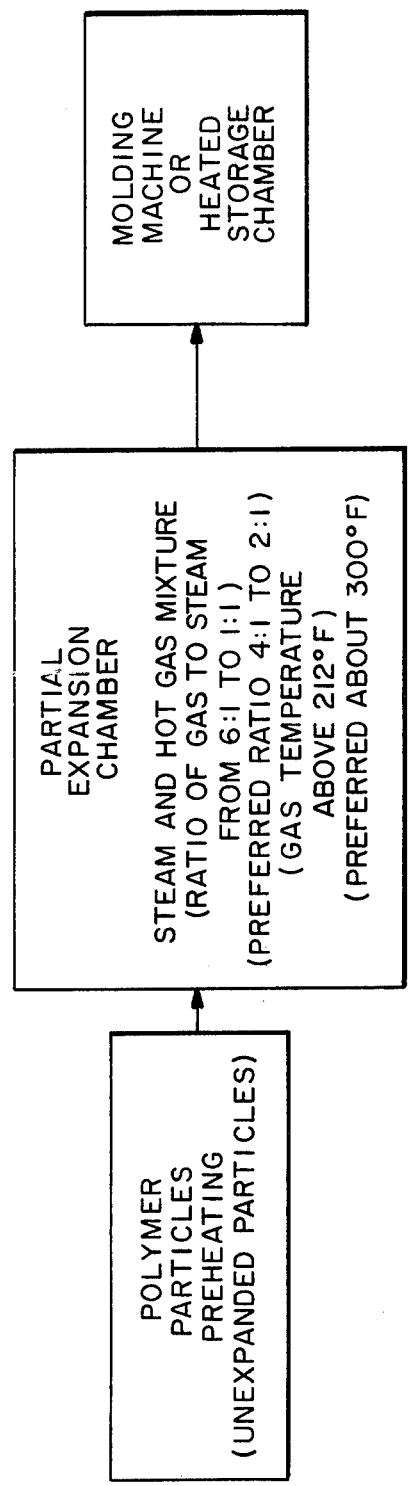

PROCESS OF PARTIALLY EXPANDING THERMOPLASTIC PARTICLES USING A MIXTURE OF STEAM AND A HOT DRY GAS

RELATED U.S. APPLICATION DATA

This application is a continuation-in-part of applications Ser. No. 288,230, filed Sept. 11, 1972 and Ser. No. 359,578 filed May 11, 1973, both now abandoned.

BACKGROUND OF THE INVENTION

This invention relates to the processing of expandable thermoplastic polymeric particles for use in the production of low density molded thermoplastic articles and more particularly to the production of partially expanded thermoplastic polymer particles having a uniform size and density.

Because of their excellent insulating and buoyancy properties and low cost expanded thermoplastic materials are widely used in the manufacture of such articles as ice chests, hot beverage drinking cups, floats, etc. These items are generally manufactured by expanding thermoplastic particles containing a blowing agent in a closed mold having the configuration of the finished article. The particles are heated to a temperature above the softening point of the thermoplastic material. When the thermoplastic material softens the blowing agent, now in the form of a gas under pressure, exerts a force on the inside portions of the particles causing them to expand outwardly.

Due to the high ratio of expansion the blowing agent containing thermoplastic particles are usually partially expanded or "pre-expanded" to a density of about 1/30th to 1/40th of their original density. The pre-expanded particles are then usually aged to permit air to infuse into the pre-expanded particles to replace blowing agent which has diffused out of the particles leaving a partial vacuum in the interior portions of the particles. After a suitable aging period the partially expanded particles are blown into a mold where they further expand to fill the mold whereupon they fuse together to form the finished article. The density of molded articles is much more uniform when the expandable particles are pre-expanded than when the beads are directly injected into the mold for full expansion therein. The pre-expansion of the expandable thermoplastic particles has been accomplished by several methods with various degrees of success. In accordance with one well known practice expandable thermoplastic particles containing, as a blowing agent, a low boiling hydrocarbon are heated by means of a hot gas, generally air, to effect the preexpansion. This is conveniently accomplished by blowing the hot air into a chamber containing the particles and equipped with means for providing agitation thereof whereby they are heated sufficiently to effect the pre-expansion. Since the hot air has a relatively low diffusion rate through the polymer material very little of the air is able to penetrate the particles; therefore most of the heating of the particles take place via conduction from the outside surfaces to the interiors of the particles. This is a very inefficient process due to the excellent insulating properties of the thermoplastic material and the density of the product produced is relatively high.

In another process steam is used as the heating medium. It has been determined that steam penetrates and diffuses into the thermoplastic material such as polystyrene much more rapidly than does air, for example, in the order of about one thousand times faster. (Modern Plastics, January 1965, p. 173). Accordingly, steam is much more efficient than hot air for heating expandable thermoplastic particles because the thermoplastic particles and the gases contained therein can be heated from the inside of the particles as well as from the outside by convection. While the use of steam results in a product with a relatively low density it presents a serious disadvantage in that the pre-expanded particles become wet from condensing steam and have a great tendency to agglomerate.

Accordingly, when steam is used as a heating medium the pre-expanded beads must be dried for long periods of time, for example, for as long as 24 hours or more, in order to render the beads free flowing.

SUMMARY OF THE INVENTION

An improved process has now been discovered in which the disadvantages of the above-mentioned processes have been substantially eliminated.

Accordingly, it is an object of the present invention to present an improved process for rapidly pre-expanding thermoplastic polymeric particles. It is a second object of the invention to present a process for preparing pre-expanded, substantially dry free-flowing thermoplastic particles having a substantially low density and being immediately ready for molding.

The foregoing objects are accomplished by a process comprising the steps of contacting thermoplastic polymeric material in particulate form containing a blowing agent with a mixture of steam and another hot dry gas whereby the mixture due to the penetrating heating capacity of the steam and the evaporating properties of the other hot dry gas will partially expand the material quickly and uniformly in a dry condition to the desired density.

The preferred thermoplastic polymers treated in the invention are the alkenyl aromatic polymers, particularly polystyrene.

BRIEF DESCRIPTION OF THE DRAWING

The invention illustrated in the attached sheet of drawing shows the improved process for preparing thermoplastic particles for molding by partial expansion thereof utilizing gaseous heating medium comprised of a steam and hot gas mixture.

DESCRIPTION OF THE INVENTION

The term "thermoplastic polymer particles" is used generally in the present discussion includes particles made by aqueous suspension type polymerization, commonly known as beads or pearls, comminuted particles such as those obtained by crushing and grinding slabs of mass polymerized thermoplastic material, and pellets obtained by extruding thermoplastic polymeric materials and cutting the extrudate into small particles generally referred to as pellets.

The class of polymers found useful in the present invention are the moldable thermoplastic polymers, particularly the vinyl polymers. Included in this group are the vinyl aromatic polymerizable compounds such as polystyrene and polymers of derivatives of styrene; halogen containing vinyl polymers, including polyvinylchloride and polyvinylidene chloride; and acrylic polymers, such as polyethylacrylate and polymethylmethacrylate. Copolymers of the above with each other or with other thermoplastic polymers can also be treated in the process of the invention. The preferred group of polymers for use in the invention are the alkenyl aromatic polymers, particularly polystyrene.

Expanding or blowing agents suitable for use in the present invention are those substances which are gaseous at atmospheric conditions or materials which are liquids or solids at atmospheric conditions but which will, upon being heated to a given temperature, produce a gaseous substance. The blowing agents are preferably substantially inert to the polymer. Thus, the blowing agent may be a gas, such as propane or butane, a low boiling inert liquid compound such as pentane, hexane, trichlorofluoromethane, etc., or a dry chemical compound such as sodium bicarbonate. Combinations of the above blowing agents can also be used in the invention. In general the blowing agent is present in an amount of about 2 to 15% and preferably about 3 to 10% based on the total weight of the composition.

A blowing agent may be incorporated into the particles by any of the usual methods, for example, thermoplastic polymeric beads made by suspension polymerization may be rendered expandable by incorporating the blowing agent in the beads either during the polymerization or subsequently to the polymerization step. In the case of pelletized material, it is usually convenient to steep the pellets into a bath of a suitable blowing agent. The expandable thermoplastic polymer particles may be prepared by a desired method and their preparation forms no part of this invention. The invention is particularly suitable for the treatment of expandable polymer in bead form and the material prepared in the following example is in bead form; however, it is understood that thermoplastic polymer particles in other forms may be treated with equally successful results by the process of the invention.

The present invention is particularly suitable for pre-expanding thermoplastic polymer particles by the batch method and, accordingly, it will be described in terms of a batch process. It is understood, however, that it is within the scope of the invention to practice the invention in the continuous process.

The other hot dry gas other than steam can be any gas which is substantially inert when in contact with the polymer particles employed herein. Typical examples of such a gas are air, carbon dioxide, nitrogen, argon and mixtures thereof. Since air is a most common and economic heating medium the invention will be further described with particular reference to air although it is understood that these other gases, for example, could be used.

In accordance with the invention expandable thermoplastic beads or other particles are charged into a closed container provided with means for agitating the beads. A mixture of heated air and steam is then fed into the container for purposes of heating the beads. The pre-expander is preferably provided with an exhaust port so that the hot air-steam mixture can pass continuously through the container during the heating period. During the heating period the beads are agitated to ensure that they will be heated uniformly throughout. When the temperature of the beads reaches the softening point of the polymer the blowing agent, now in the form of a gas, causes the beads to expand to the desired density. The steam is able to penetrate thermoplastic polymer material at a rate many times as fast as hot air (estimated to be at least 1000 times as fast). Due to the rapid diffusion rate of steam the thermoplastic polymer beads can be heated from the interior portions with the use of steam, whereas, when hot air is used alone the beads must be heated from the outside, and therefore, a much longer period of heating is required to raise the beads to their expansion temperature. The hot air component of the heating medium presents the advantage that the thermoplastic polymer beads can be contacted with a large quantity of heat without the attendant disadvantage normally associated with steam heating of the introduction of a substantial quantity of water caused by the condensation of the steam. The hot air should be of a temperature to effect the partial expansion of the beads even without the steam to insure that the beads will be heated evenly and quickly both from within and outside of the beads. Upon completion of the pre-expansion step the beads are discharged into a heating storage container where they are stored at a temperature preferably higher than the boiling point of the blowing agent contained within the beads until they are ready to be charged into a molding machine.

It has been found that the hot air should be of a temperature of above 212° F to prevent the possibility of producing condensation of the water vapor in the stream. The temperature of the air or of the air steam mixture should not exceed the temperature at which the polymer beads or particles liquify and flow. In the preferred embodiment of the invention the temperature of the heated air is maintained at about 300° F.

The steam which is mixed with the heated air is preferably substantially dry, that is, it should contain very little, if any, water vapor. In a preferred embodiment of the invention the steam is superheated and will be kept at least above 250° F. It has been found that when the steam is substantially dry or is superheated that very little moisture is deposited on the surfaces of the beads even if they are initially contacted in an unheated condition and, accordingly, it is not necessary to dry the beads for considerable periods of time to remove surface moisture in order to render the beads free flowing. It is preferable, however, that the beads be preheated to a temperature of at least within about 20° F. of the softening temperature in order to minimize the possibility of condensation upon initial contact with steam that may not be quite as dry as desired (softening temperature is defined as the lowest temperature at which the bead begins to change from a rigid to a soft state in a particular environment.) Preheating the beads will also shorten the exposure time to the steam and heated air mixture. The steam and the air may be heated separately or they may be combined and heated to the desired temperature. The ratio of hot air to steam may vary from about 6:1 to about 1:1. In a preferred embodiment of the invention the ratio of hot air to steam varies from about 4:1 to about 2:1.

The invention is further exemplified in the following example in which parts and percentages are on a weight basis unless otherwise specified:

EXAMPLE 1

Into a one gallon batch pre-expander equipped with an inlet port and outlet port for a gaseous heating medium and inlet and discharge ports for charging expandable beads and removing the pre-expanded product is charged 5 ozs. of expandable polystyrene beads preheated to a temperature of 150° F. and containing 6% n-pentane as a blowing agent. The sidewall of the pre-expander is cylindrical and is made of transparent glass so that the expansion of the beads can be observed. The gas enters the pre-expansion base of the chamber, such that the entering gas causes the beads to move in a highly agitated motion. The gaseous heating medium is comprised of hot air having a temperature of 310° F. and superheated steam having a temperature of 300° F. The ratio of hot air to steam is set at 2:1 and the heating medium is introduced into the pre-expansion chamber at a rate of about 5 cubic/ft. per minute. After 45 seconds the beads began to expand and the beads were further heated for a total of one minute. The heating medium inlet port is closed off and the beads were removed from the pre-expander examined. They were found to be dry and free flowing and had a uniform size and density. The bulk density of the expanded beads was 1.05 lbs./cubic ft.

I claim:

1. An improved process for preparing thermoplastic polymer particles for molding by partial expansion thereof, said thermoplastic particles containing a normally liquid blowing agent, comprising:

charging an amount of said particles into a chamber;

heating said particles while agitating them in said chamber to a temperature above the atmospheric boiling point of the blowing agent and the softening temperature of the particles with a gaseous heating medium comprised of a mixture of steam and another dry hot gas, the ratio of the other dry hot gas to steam in the mixture being in the range of about 6:1 to about 1:1 and wherein the other dry hot gas of the mixture when added thereto is at a temperature above 212° F., but below the temperature at which said polymer particles liquify and flow, a substantial portion of the steam penetrating the particles to heat the inner portions thereof and a substantial portion of the other dry hot gas serving to heat the outside of the particles to keep them dry by immediately evaporating any condensation from the steam on the outside of the particles.

2. The process of claim 1 wherein the ratio of hot gas to steam in the mixture is between about 2:1 to 4:1.

3. The process of claim 1 wherein the gaseous heating medium comprises a mixture of steam and hot air.

4. The process of claim 1 wherein the steam is substantially dry containing very little or no entrained water.

5. The process of claim 1 wherein the steam is superheated.

6. The process of claim 1 wherein the thermoplastic polymer particles are preheated before entering said chamber to a temperature of at least within about 20° F. of the softening temperature of the polymer particles to limit condensation caused by steam contacting the cool surfaces of the polymer particles.

* * * * *